United States Patent

[11] 3,580,001

| | | |
|---|---|---|
| [72] | Inventor | Keith V. Eisberg<br>Martinsville, Ind. |
| [21] | Appl. No. | 756,783 |
| [22] | Filed | Sept. 3, 1968 |
| [45] | Patented | May 25, 1971 |
| [73] | Assignee | Carrier Corporation<br>Syracuse, N.Y. |

[54] ABSORPTION REFRIGERATION MACHINE WITH CONCENTRATION CONTROL TANK
4 Claims, 1 Drawing Fig.

[52] U.S. Cl. .................................................. 62/101,
62/476
[51] Int. Cl. ...................................................... F25b 15/04
[50] Field of Search ........................................... 62/147,
476, 111, 103; 62/488

[56] References Cited
UNITED STATES PATENTS

| | | | |
|---|---|---|---|
| 2,136,600 | 11/1938 | Ullstrand ...................... | 62/103 |
| 2,282,503 | 5/1942 | Thomas et al. ............... | 62/103X |
| 2,484,669 | 10/1949 | Backstrom ................... | 62/103 |
| 3,279,202 | 10/1966 | Eberz ........................... | 62/488 |

*Primary Examiner*—Meyer Perlin
*Assistant Examiner*—P. D. Ferguson
*Attorneys*—Herman Seid and Harry G. Martin, Jr.

ABSTRACT: An absorption refrigeration system employing a liquid storage tank to vary the concentration of refrigerant in the solution supplied to the absorber under varying ambient temperature operating conditions.

Patented May 25, 1971
3,580,001
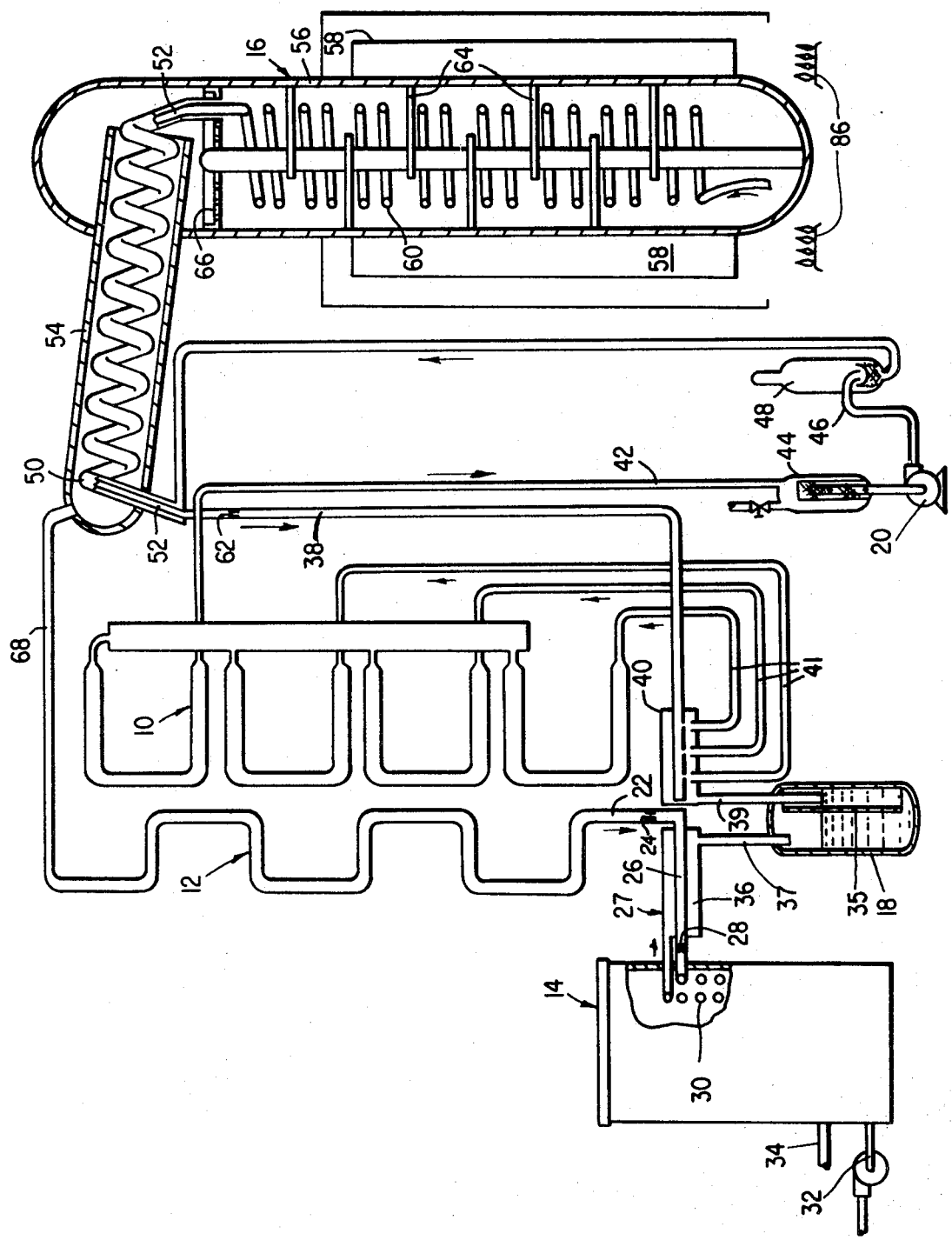
INVENTOR.
KEITH V. EISBERG.
BY James E Schardt
ATTORNEY.

3,580,001

ABSORPTION REFRIGERATION MACHINE WITH CONCENTRATION CONTROL TANK

BACKGROUND OF THE INVENTION

In an absorption refrigeration machine utilizing ambient air for cooling the absorber, the absorber pressure may vary in response to the ambient air temperature. As ambient temperatures increase, the pressure of the absorber may increase which results in a pressure drop across the machine evaporator insufficient to allow all of the refrigerant supplied to the evaporator to be evaporated therein. This will cause evaporator temperatures to increase to a point where the temperature differential between the refrigerant in the evaporator and the temperature of the heat exchange medium being chilled thereby is insufficient to transfer the necessary quantity of heat therebetween. This results in a decrease of machine capacity at a time when maximum machine capacity is required.

As the ambient air temperature drops, the absorber pressure drops. Therefore, when the machine is operating under low ambient air temperature conditions, the absorber pressure may be low enough to cause a large pressure differential to exist across the evaporator. This may result in extremely low evaporator temperatures which could freeze the heat exchange medium being passed through the evaporator and reduce or block the flow of chilled heat exchange medium being supplied to satisfy the refrigeration load.

SUMMARY OF THE INVENTION

This invention relates to an absorption refrigeration system having a generator and a condenser on the high-pressure side and an absorber and evaporator on the low side thereof connected to provide refrigeration. A solution storage vessel is disposed between the evaporator and the absorber. The evaporator communicates with the top portion of the storage vessel. The storage vessel includes a first tubular baffle having an open lower end communicating with the bottom portion of the storage vessel and an open upper end communicating with the top portion of the storage vessel. A pickup tube having an opening therein within the tubular baffle is provided to supply solution from the lower portion of the storage vessel and vapor to the absorber and maintain a level of collected solution in the storage vessel corresponding to the position of the opening in the pickup tube. As ambient temperature and therefore absorber pressure rises, the refrigerant concentration of the solution in the top portion of the vessel will increase due to the increase in the quantity of liquid refrigerant supplied thereto from the evaporator. The solution in the lower portion of the vessel, having a lower concentration of refrigerant therein, is forwarded to the absorber to reduce absorber pressures and increase machine capacity. As ambient temperature and therefore absorber pressure drops, the refrigerant concentration of the solution in the top portion of the vessel will decrease due to the decreased quantity of liquid refrigerant supplied thereto from the evaporator. The solution in the lower portion of the vessel, having a higher refrigerant concentration, is forwarded to the absorber to increase absorber pressures and reduce machine capacity to prevent evaporator freezeup.

BRIEF DESCRIPTION OF THE DRAWING

The drawing is a schematic diagram of an absorption refrigeration system employing the storage vessel of the present invention.

DESCRIPTION OF THE PREFERRED EMBODIMENT

Referring to the drawing there is shown a refrigeration system comprising an absorber 10, a condenser 12, a chiller 14, a generator 16 and a concentration control storage vessel 18 connected to provide refrigeration. A pump 20 is employed to circulate weak absorbent solution from absorber 10 to generator 16.

As used herein the term "weak absorbent solution" refers to solution which is weak in absorbent power and the term "strong absorbent solution" refers to a solution which is strong in absorbent power. A suitable absorbent for use in the system described is water and a suitable refrigerant is ammonia.

Liquid refrigerant condensed in condenser 12 passes through refrigerant liquid passage 22 and refrigerant restrictor 24 to heat exchange tube 26 of liquid suction heat exchanger 27. The liquid refrigerant which is cooled in tube 26 passes through refrigerant restriction 28 into evaporator coil 30 of chiller 14.

A heat exchange medium such as water is passed over the exterior of coil 30 where it is chilled by giving up heat to evaporate the refrigerant within the heat exchanger. The chilled heat exchange medium passes out of chiller 14 through line 32 to suitable remote heat exchangers (not shown) after which it is returned to the chiller through inlet 34 for rechilling.

The cold refrigerant evaporated in evaporator coil 30 passes through refrigerant vapor passage 36 of liquid suction heat exchanger 27 in heat exchange relation with liquid refrigerant passing through tube 26. Refrigerant vapor having a small proportion of absorbent liquid therewith passes from passage 36 through storage vapor inlet line 37 into concentration control storage vessel 18. Refrigerant vapor and solution from vessel 18 passes through pickup tube 39 into vapor distributor 40. A tubular baffle 35 having an open lower end near the bottom of vessel 18 and an open upper end near the top of vessel 18 is provided within vessel 18 to assure that the solution supplied to pickup tube 39 is taken from the lower portion of vessel 18 for reasons to be hereinafter explained. Strong solution which is supplied from the generator to the vapor distributor 40 through line 38 is discharged into absorber supply lines 41 to induce refrigerant vapor from distributor 40 into tubes 41. The strong solution with the refrigerant vapor therein is supplied to absorber 10 where cooling medium, preferably ambient air is passed over the surface of the absorber in heat exchange relation with the solution therein for cooling the absorbent solution to promote the absorption of the refrigerant vapor by the solution. The same cooling medium may be supplied to condenser 12 in heat exchange relation with refrigerant vapor therein to condense the refrigerant.

Cold weak absorbent solution passes from absorber 10 through a line 42 into pump inlet tank 44. Weak solution from inlet tank 44 is supplied to weak solution pump 20. Liquid from pump 20 passes through pump discharge line 46 and tank 48 to rectifier heat exchange coil 50. The weak solution passes through coil 50 in heat exchange relation with hot strong solution passing through heat exchange coil 52 disposed within coil 50 and with the hot refrigerant vapor flowing through rectifier shell 54 in contact with the outer surface of coil 50. The weak solution from coil 50 is discharged into the upper portion of generator 16 along with any vapor which is formed in coil 50 due to heat exchange with the hot vapor passing thereover and the hot solution flowing therethrough.

Generator 16 comprises a shell 56 having fins 58 suitably affixed thereto as by welding. The generator is heated by a gas burner 86 or other suitable heating means. The weak solution is boiled in generator 16 to concentrate the solution, thereby forming a strong solution and refrigerant vapor.

The hot strong absorbent solution passes upwardly through the analyzer section of generator 16 through analyzer coil 60 in heat exchange with weak solution passing downwardly over the coil. The warm strong solution then passes through heat exchange coil 52 and line 38 into vapor distributor 40. A restrictor 62 is provided in line 38 so that the solution supplied to the vapor distributor is at the same pressure as the vapor in vapor distributor 40.

Refrigerant vapor formed in generator 16 passes upwardly through the analyzer section thereof where it is concentrated by mass heat transfer with weak solution passing downwardly over analyzer coil 60. Analyzer plates 64 in generator 16 provide a tortuous path for flow of solution and vapor, assuring intimate contact therebetween to improve the mass heat transfer. The refrigerant vapor from the analyzer section passes through reflux plate 66 in heat exchange relation with absorbent condensed within rectifier 54. The vapor then passes through rectifier 54 in heat exchange relation with the weak solution passing through coil 50. Absorbent condensed in rectifier 54 flows downwardly onto plate 66 where it is heated by the refrigerant vapor passing therethrough. The heated absorbent is then passed to the generator along with the weak solution discharged into the generator from coil 50. The vapor formed in the generator is a mixture of refrigerant vapor and absorbent vapor. The analyzer plates, reflux plate and rectifier purify the refrigerant vapor by condensing the water or absorbent vapor from the mixture. It is desirable to remove as much absorbent vapor from the refrigerant vapor as possible since the presence of absorbent in the refrigerant supplied to the condenser decreases the efficiency of the cycle. However, it is very difficult, if not impossible, to completely purify the refrigerant vapor. As such, refrigerant vapor which is passed from rectifier 54 through line 68 to condenser 12 to complete the refrigeration cycle has a small proportion of absorbent vapor mixed therewith.

Considering the operation of the refrigeration system under high ambient operating conditions, liquid refrigerant supplied to the evaporator coil will not completely flash due to the small pressure drop therein created by high absorber pressure. Refrigerant vapor, refrigerant liquid and the small proportion of liquid absorbent which is not removed from the refrigerant before passage to the condenser and evaporator will pass through the evaporator coil into storage vessel 18. Pickup tube 39 will pass refrigerant vapor along with the mixture of liquid refrigerant and liquid absorbent from within tubular baffle 35 to vapor distributor 40. The liquid refrigerant having a small proportion of absorbent solution therein will remain in the upper portion of the collected liquid in vessel 18. The solution withdrawn from vessel 18 through tube 39 from the bottom of vessel 18 will have a lower concentration of refrigerant than that supplied to the vessel. The reduced refrigerant concentration of the solution supplied to the absorber will cause absorber pressures to decrease, thereby creating the desired pressure drop across the evaporator for complete flashing of the refrigerant therein. This will lower evaporator temperatures to provide a temperature differential between the evaporator and chilled water sufficient for optimum heat transfer therebetween.

Under low ambient operating conditions, a large pressure drop will exist across the evaporator due to the low pressure existing in absorber 10. This will cause complete flashing of the refrigerant in evaporator coil 30. The only liquid being supplied to storage vessel 18 under these conditions therefore will be the small quantity of absorbent solution present in the liquid refrigerant supplied to the evaporator. This solution may have a relatively small proportion of refrigerant absorbed therein. Solution having a larger proportion of refrigerant absorbed therein will be drawn from the lower portion of vessel 18 into pickup tube 39 and vapor distributor 40. This will effectively increase the refrigerant concentration of the solution supplied to the absorber which will cause absorber pressures to rise, reducing the pressure differential across the evaporator and thereby raising evaporator temperatures to prevent freezing of heat exchange medium passing therethrough.

While I have described a preferred embodiment of my invention it is to be understood that the invention is not limited thereto but may be otherwise embodied within the scope of the following claims.

I claim:

1. An air-cooled absorption refrigeration system having a generator and condenser on the high-pressure side and an absorber and evaporator on the low pressure side thereof connected to provide refrigeration, a storage vessel having an inlet therein communicating with the discharge side of said evaporator; and passage means for supplying vapor and solution from said storage vessel to said absorber while maintaining a constant solution level in said vessel for increasing the concentration of refrigerant in the solution supplied to the absorber as cooling air temperatures decrease and decreasing the concentration of refrigerant in the solution supplied to the absorber as cooling air temperatures increase.

2. An absorption refrigeration machine according to claim 1 wherein said passage means includes a pickup tube disposed within said vessel, said tube having an opening therein at a location corresponding to the desired level of collected solution in said vessel for passage of solution and refrigerant vapor from said vessel into said pickup tube, said pickup tube being adapted to receive solution from a location in said vessel remote from the inlet.

3. An absorption refrigeration system according to claim 2 wherein the inlet to said vessel is disposed in the top portion thereof, said passage means further including a baffle disposed in said vessel, said baffle having a first opening therein adjacent the lower portion of said vessel for passage of solution from said vessel into said baffle and an opening adjacent the top portion of said vessel for passage of refrigerant vapor from said vessel into said baffle, the opening of said pickup tube communicating with the interior of said baffle for passage of liquid and refrigerant vapor from within said baffle into said pickup tube.

4. A method for controlling the capacity of an air-cooled absorption refrigeration machine in response to ambient air temperature which consists in the steps of:

reducing the concentration of refrigerant in the solution supplied to the machine absorber as ambient air temperature increases to reduce absorbent pressure, and increasing the concentration of refrigerant in the solution supplied to the absorber as ambient air temperatures decreases, the concentration of refrigerant being reduced by discharging refrigerant vapor and solution having a high concentration of refrigerant therein from the machine evaporator into the top portion of a storage vessel; and passing refrigerant from the top portion of the vessel and solution having a low concentration of refrigerant from the bottom portion of the vessel to the absorber while maintaining a constant level of solution within the storage vessel, the concentration of refrigerant being increased by discharging refrigerant vapor and solution having a low concentration of refrigerant therein from the machine evaporator into the top portion of a storage vessel; and passing refrigerant from the top portion of the vessel and solution having a high concentration of refrigerant from the bottom portion of the vessel to the absorber while maintaining a constant level of solution within the storage vessel.